(12) United States Patent
Liu et al.

(10) Patent No.: US 12,517,283 B2
(45) Date of Patent: Jan. 6, 2026

(54) OPTICAL FILM LAYER AND MANUFACTURING METHOD THEREOF, POLARIZER, AND DISPLAY PANEL

(71) Applicant: TCL CHINA STAR OPTOELECTRONICS TECHNOLOGY CO., LTD., Guangdong (CN)

(72) Inventors: Gang Liu, Guangdong (CN); Weiheng Yang, Guangdong (CN); Wei Wang, Guangdong (CN)

(73) Assignee: TCL CHINA STAR OPTOELECTRONICS TECHNOLOGY CO., LTD., Guandong (CN)

( * ) Notice: Subject to any disclaimer, the term of this patent is extended or adjusted under 35 U.S.C. 154(b) by 757 days.

(21) Appl. No.: 17/754,949

(22) PCT Filed: Apr. 1, 2022

(86) PCT No.: PCT/CN2022/084739
§ 371 (c)(1),
(2) Date: Apr. 18, 2022

(87) PCT Pub. No.: WO2023/173508
PCT Pub. Date: Sep. 21, 2023

(65) Prior Publication Data
US 2024/0151877 A1     May 9, 2024

(30) Foreign Application Priority Data
Mar. 18, 2022   (CN) .......................... 202210270051.0

(51) Int. Cl.
G02B 1/11    (2015.01)
G02B 5/30    (2006.01)

(52) U.S. Cl.
CPC .............. G02B 1/11 (2013.01); G02B 5/3033 (2013.01)

(58) Field of Classification Search
CPC ........... G02B 1/11; G02B 1/111; G02B 1/115; G02B 1/116; G02B 1/118; G02B 1/10
See application file for complete search history.

(56) References Cited

U.S. PATENT DOCUMENTS

2003/0202137 A1   10/2003   Nakamura et al.
2004/0071937 A1*  4/2004   Chien ...................... C09D 5/00
                                                                    428/1.31
(Continued)

FOREIGN PATENT DOCUMENTS

CN    101339260 A    1/2009
CN    102073073 A    5/2011
(Continued)

OTHER PUBLICATIONS

International Search Report in International application No. PCT/CN2022/084739, mailed on Sep. 29, 2022.
(Continued)

*Primary Examiner* — Sharrief I Broome
*Assistant Examiner* — Journey F Sumlar
(74) *Attorney, Agent, or Firm* — PV IP PC; Wei Te Chung

(57) ABSTRACT

An optical film layer and a manufacturing method thereof, a polarizer, and a display panel are provided. The optical film layer includes a base layer and a group of particle layers arranged in the base layer. The group of particle layers includes multiple particle layers, and refractive indices of the multiple particle layers gradually decrease in a direction from a first side of the optical film layer to a second side of the optical film layer.

15 Claims, 3 Drawing Sheets

(56) References Cited

U.S. PATENT DOCUMENTS

| | | | |
|---|---|---|---|
| 2004/0209068 A1 | 10/2004 | Lin et al. | |
| 2006/0071231 A1 | 4/2006 | Han et al. | |
| 2008/0030860 A1 | 2/2008 | Chang | |
| 2008/0193680 A1 | 8/2008 | Takahashi et al. | |
| 2009/0027592 A1* | 1/2009 | Motomatsu | G02F 1/133504 |
| | | | 445/25 |
| 2009/0322988 A1* | 12/2009 | Kim | G02B 6/0056 |
| | | | 349/65 |
| 2011/0242463 A1* | 10/2011 | Park | G02B 5/0263 |
| | | | 427/162 |
| 2012/0176812 A1* | 7/2012 | Hwang | G02B 5/0278 |
| | | | 362/606 |
| 2018/0059501 A1 | 3/2018 | Ouderkirk et al. | |
| 2021/0080617 A1 | 3/2021 | Xu | |

FOREIGN PATENT DOCUMENTS

| | | |
|---|---|---|
| CN | 102436019 A | 5/2012 |
| CN | 104267453 A | 1/2015 |
| CN | 106772747 A | 5/2017 |
| CN | 206818900 U | 12/2017 |
| CN | 207281323 U | 4/2018 |
| CN | 111580191 A | 8/2020 |
| CN | 211180274 U | 8/2020 |
| CN | 112114392 A | 12/2020 |
| CN | 112327394 A | 2/2021 |
| CN | 112375243 A | 2/2021 |
| JP | 2006251666 A | 9/2006 |
| JP | 2010078888 A | 4/2010 |
| JP | 2010107616 A | 5/2010 |
| JP | 2011039332 A | 2/2011 |
| JP | 2020042137 A | 3/2020 |
| KR | 20150079051 A | 7/2015 |
| WO | 2021227162 A1 | 11/2021 |

OTHER PUBLICATIONS

Written Opinion of the International Search Authority in International application No. PCT/CN2022/084739, mailed on Sep. 29, 2022.

Chinese Office Action issued in corresponding Chinese Patent Application No. 202210270051.0 dated Oct. 20, 2022, pp. 1-8.

Chinese Office Action issued in corresponding Chinese Patent Application No. 202210270051.0 dated Mar. 13, 2023, pp. 1-6.

Chinese Office Action issued in corresponding Chinese Patent Application No. 202210270051.0 dated Jun. 16, 2023, pp. 1-7.

Chinese Office Action issued in corresponding Chinese Patent Application No. 202210270051.0 dated Mar. 15, 2024, pp. 1-7.

Chinese Rejection Decision issued in corresponding Chinese Patent Application No. 202210270051.0 dated Sep. 22, 2023, pp. 1-7.

* cited by examiner

OPTICAL FILM LAYER AND MANUFACTURING METHOD THEREOF, POLARIZER, AND DISPLAY PANEL

FIELD OF INVENTION

The present application relates to a field of display technology, and particularly relates to an optical film layer and a manufacturing method thereof, a polarizer, and a display panel.

BACKGROUND OF INVENTION

Ambient light reflected by a display screen is called glare. The glare of the display screen not only greatly reduces a display effect, but also adversely affects users' vision health. Currently, mainstream anti-glare technologies include surface roughening, and setting of micro/nano meta-surfaces, anti-reflection coatings, or optical particles, etc. Wherein, a main function of the optical particles is to generate haze to increase diffuse reflection, and to adjust the haze by controlling particle size and density of the optical particles. With an improvement in display resolution, the display screen is prone to have a phenomenon of uneven haze and flashpoints due to an uneven distribution of the optical particles and excessive particle size.

Currently, diffusing particles with lower density can be doped into a resin material to make the particles evenly distributed on a surface of the resin material without increasing a particle size of the particle or increasing particle stacking, which can increase distribution uniformity of the diffusing particles, effectively improve uniformity of haze, and prevent a phenomenon of flashpoints from occurring. However, due to the diffusing particles are only covered with a single layer on the surface of the resin, the diffusing particles are exposed on the surface of the resin layer, and are prone to scratches or even being detached during use, which causes the anti-glare effect to be reduced or unstable.

Technical Problem

A current anti-glare film has a technical problem that an anti-glare effect is unstable due to the diffusing particles are exposed on the surface of the resin layer and are easily scratched or detached.

SUMMARY OF INVENTION

The present application provides an optical film layer and a manufacturing method thereof, a polarizer, and a display panel to improve the technical problem that the current optical film layer is prone to scratched or even detachment when the optical particles are exposed on the surface, resulting in an unstable anti-glare effect.

In order to solve the aforesaid technical problem, the technical solutions provided by the present application are as follows:

The present application provides an optical film layer, including a base layer; and a group of particle layers arranged in the base layer, wherein the group of particle layers includes multiple particle layers; wherein refractive indices of the multiple particle layers gradually decrease in a direction from a first side of the optical film layer to a second side of the optical film layer.

In the optical film layer of the present application, the group of particle layers includes at least a first particle layer and a second particle layer, wherein the first particle layer is close to the first side of the optical film layer, and the second particle layer is close to the second side of the optical film layer.

In the optical film layer of the present application, the first particle layer is positioned within the base layer, and the second particle layer is positioned on a surface of the base layer.

In the optical film layer of the present application, the first particle layer includes a plurality of first optical particles, and the second particle layer includes a plurality of second optical particles.

In the optical film layer of the present application, a refractive index of the first optical particles and a refractive index of the second optical particles are the same.

In the optical film layer of the present application, a size of one of the first optical particles is smaller than a size of one of the second optical particles.

In the optical film layer of the present application, the first particle layer includes a plurality of first optical particles and the second particle layer includes a plurality of second optical particles, and wherein a size of one of the first optical particles is the same as a size of one of the second optical particles.

In the optical film layer of the present application, a refractive index of the first optical particle is greater than a refractive index of the second optical particle.

In the optical film layer of the present application, the first particle layer includes a plurality of first optical particles, and the second particle layer includes a plurality of second optical particles, wherein the plurality of first optical particles and the plurality of second optical particles are hollow shell structures.

In the optical film layer of the present application, the first optical particles and the second optical particles are spherical shells with hollow interiors.

In the optical film layer of the present application, a refractive index of the first optical particles is the same as a refractive index of the second optical particles.

In the optical film layer of the present application, a size of one of the first optical particles is the same as a size of one of the second optical particles.

In the optical film layer of the present application, a shell thickness of the first optical particle is greater than a shell thickness of the second optical particle.

In the optical film layer of the present application, a ratio of a shell thickness of one of the spherical shells to a radius of the spherical shell is greater than or equal to $1/5$.

In the optical film layer of the present application, the first particle layer includes a plurality of first optical particles, and the second particle layer includes a plurality of second optical particles, wherein a refractive index of the plurality of first optical particles is the same as a refractive index of the plurality of second optical particles, and wherein a size of one of the first optical particles is the same as a size of one of the second optical particles.

In the optical film layer of the present application, in a top view of the optical film layer, a distribution density of the first optical particles is less than a distribution density of the second optical particles.

In the optical film layer of the present application, the first particle layer includes first optical particles, and the second particle layer includes second optical particles, wherein a size of one of the first optical particles and a size of one of the second optical particles are smaller than a wavelength of visible light.

The present application further provides a manufacturing method of an optical film layer for manufacturing the aforesaid optical film layer, including: forming a first base layer provided with at least one particle layer on a substrate; forming a second base layer provided with at least one particle layer on the first base layer; and peeling off the substrate to form an optical film layer; wherein a material of the first base layer and a material of the second base layer are the same to form an integral base layer; and wherein a refractive index of the at least one particle layer gradually decreases in a direction from the first base layer to the second base layer.

The present application further provides a polarizer including the aforesaid optical film layer.

The present application further provides a display panel, including a panel and the polarizer, wherein the polarizer is provided above a light-emitting surface of the panel.

Advantages

In the present application, a group of particle layers including multiple particle layers is provided in the base layer, where the refractive indices of the multiple particle layers gradually increase in a direction from a first side of the optical film layer to a second side of the optical film layer, so that the multiple particle layers form a composite film layer with graded refractive indices in the base layer. The multiple particle layers can convert specular reflection into diffuse reflection to cause the optical film layer to have characteristics of high haze and low reflection. Furthermore, a large number of particles are embedded in the base layer, which can effectively prevent the particles from being scratched or detached. In addition, the optical film layer can be manufactured by a mature optical particle anti-glare technology so the manufacturing cost can be effectively reduced.

DESCRIPTION OF DRAWINGS

In order to illustrate the technical solutions in the embodiments of the present application more clearly, the following briefly introduces the drawings that need to be used in the description of the embodiments. Obviously, the drawings in the description are only some embodiments of the present application. For one skilled in the art, other drawings can also be obtained from these drawings without doing any creative effort.

Figure 1:
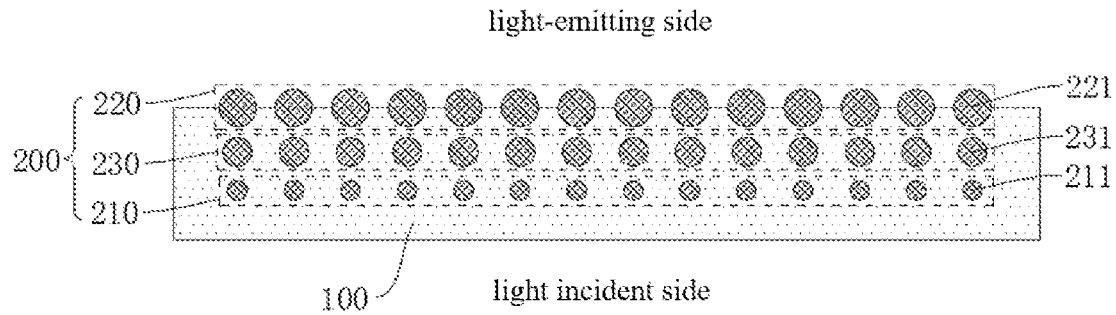
FIG. 1 is a first structural schematic diagram of an optical film layer described in the present application.

REFERENCE NUMERALS base layer 100, group of particle layers 200, first particle layer 210, first optical particle 211, second particle layer 220, second optical particle 221, embedded portion 2211, convex portion 2212, third particle layer 230, third optical particle 231.

DETAILED DESCRIPTION OF PREFERRED EMBODIMENTS

The technical solutions in the embodiments of the present application will be clearly described with reference to the drawings in the embodiments of the present application. Obviously, the embodiments are only a part of the embodiments of the present application, but not all the embodiments. Based on these embodiments in the present application, all other embodiments obtained by one skilled in the art without doing creative efforts shall fall within the protection scope of this application. In addition, the specific embodiments described herein are only used to illustrate and explain the present application rather than limit the present application. In the present application, unless otherwise stated, directional words such as "upper" and "lower" generally refer to the upper and lower parts of the device in actual use or working state, specifically the direction in the drawings, and "inner" and "outer" are relative to the outline of the device.

The ambient light reflected by the display screen is called glare, and the glare of the display screen will not only greatly reduce the display effect, but also adversely affect the users' vision health. Currently, the mainstream anti-glare technologies include surface roughening, the setting of micro/nano meta-surfaces, anti-reflection coatings, optical particles, etc. Wherein, the main function of the optical particles is to generate haze to increase diffuse reflection. However, due to the uneven distribution of optical particles and excessive particle size, the display screen is prone to have uneven haze and flashpoints.

Currently, diffusing particles with lower density can be doped into a resin material to make the particles evenly distributed on a surface of the resin material without increasing a particle size of the particle or increasing the particle stacking, which can increase distribution uniformity of the diffusing particles, effectively improve uniformity of haze, and prevent a phenomenon of flashpoints from occurring. However, due to the diffusing particles are only covered with a single layer on the surface of the resin, the diffusing particles are exposed on the surface of the resin layer, and are prone to scratches or even being detached during use, which causes the anti-glare effect to be reduced or unstable. In addition, a single layer of optical particles cannot form an effective micro/nanostructure, so it is difficult to reduce the reflection amount. The present application proposes following solutions for resolving the aforesaid technical problem.

Please refer to FIG. 1 to FIG. 6, the present application provides an optical film layer. The optical film layer includes a base layer 100 and a group of particle layers 200 arranged in the base layer 100, wherein the group of particle layers 200 includes multiple particle layers. Wherein, the refractive indices of the multiple particle layers gradually decrease in a direction from a first side of the optical film layer to a second side of the optical film layer.

In the present application, through the aforesaid settings, the multiple particle layers form a composite film layer with graded refractive indices in the base layer 100, and the optical particles can form an effective micro/nanostructure, and convert specular reflection into diffuse reflection, so that the optical film layer has characteristics of high haze and low reflection. Furthermore, a large number of particles are embedded in the base layer 100, which can also effectively prevent the particles from being scratched or detached. In addition, the optical film layer can be manufactured by a mature optical particle anti-glare technology so the manufacturing cost can be effectively reduced.

In this embodiment, the base layer 100 may be a flexible film layer formed by a resin material, and the resin material may be an organic optical film material such as polyimide, polyethylene terephthalate (PET), or the like.

In this embodiment, the multiple particle layers may be formed by hierarchically dispersing a plurality of optical particles in the material of the base layer 100, and the optical particles may be glass microbeads or transparent plastic microbeads, or the like.

In this embodiment, the shape of the optical particles may be spherical, cubic, cone, pyramid, etc., which is not specifically limited in this embodiment. It should be noted that, in the following embodiments of the present application, only spherical optical particles are used as a representative for description, and other shapes of optical particles can be deduced in the same way.

In this embodiment, the optical film layer may be disposed on the display panel or the light-emitting surface of the display screen, wherein the first side of the optical film layer can be attached to the display panel or the light-emitting surface of the display screen, and the second side of the optical film layer is the side away from the light-emitting surface of the display panel or the display screen.

In this embodiment, "the refractive index of the particle layer" can be understood as the overall refractive index of the particle layer formed by a plurality of optical particles in the same plane.

In this embodiment, the refractive index of the multiple particle layers is less than the refractive index of the base layer 100.

Each of them will be described in detail below. It should be noted that the description order of the following embodiments is not intended to limit the preferred order of the embodiments.

Please refer to FIG. 1, which is a first structural schematic diagram of an optical film layer described in the present application. In the optical film layer of the present application, the group of particle layer 200 includes at least a first particle layer 210 and a second particle layer 220, the first particle layer 210 is close to the first side of the optical film layer, and the second particle layer 220 is close to the second side of the optical film layer. The first particle layer 210 is positioned in the base layer 100, and the second particle layer 220 is positioned on the surface of the base layer 100.

In this embodiment, by arranging the group of particle layers 200 to at least include the first particle layer 210 positioned in the base layer 100 and the second particle layer 220 positioned on the surface of the base layer 100, both the inside and the surface of the optical film layer have a good diffuse reflection effect. It further improves the haze uniformity and also effectively reduces the risk of unstable anti-glare effects caused by the detachment of particles on the surface.

Please refer to FIG. 1, in the optical film layer of the present application, the first particle layer 210 may include a plurality of first optical particles 211, and the second particle layer 220 may include a plurality of second optical particles 221. The plurality of the first optical particles 211 are randomly dispersed in the base layer 100 to form the first particle layer 210, and the plurality of the second optical particles 221 are randomly dispersed in the base layer 100 to form the second particle layer 220.

In this embodiment, the distribution density of the first optical particles 211 in the first particle layer 210 and the distribution density of the second optical particles 221 in the second particle layer 220 may be the same. It should be noted that, since the optical particles of the first particle layer 210 and the second particle layer 220 are randomly distributed, the "same distribution density" in this embodiment can be understood as the average distribution density of the first optical particles 211 in each region of the first particle layer 210 is approximately the same or similar to the average distribution density of the second optical particles 221 in each region of the second particle layer 220.

In this embodiment, the refractive indices of the first optical particles 211 and the second optical particles 221 may be the same. In other words, the materials of the first optical particles 211 and the second optical particles 221 may be the same.

Taking the first optical particle 211 and the second optical particle 221 as spherical particles as an example, the diameter of the first optical particle 211 may be smaller than the diameter of the second optical particle 221.

In this embodiment, through the aforesaid settings, the ratio of the second optical particles 221 on the surface of the optical film layer to the base layer 100 with a high refractive index is relatively low, and the overall reflectivity of the first particle layer 210 is greater than that of the second optical film layer 220. That is, the refractive index of the optical film layer decreases in the direction from the first side of the optical film layer to the second side of the optical film layer, which can show an equivalent graded refractive indices effect macroscopically. This effectively reduces the total amount of ambient light reflected by the optical film layer and effectively improves the anti-glare effect.

Figure 2:
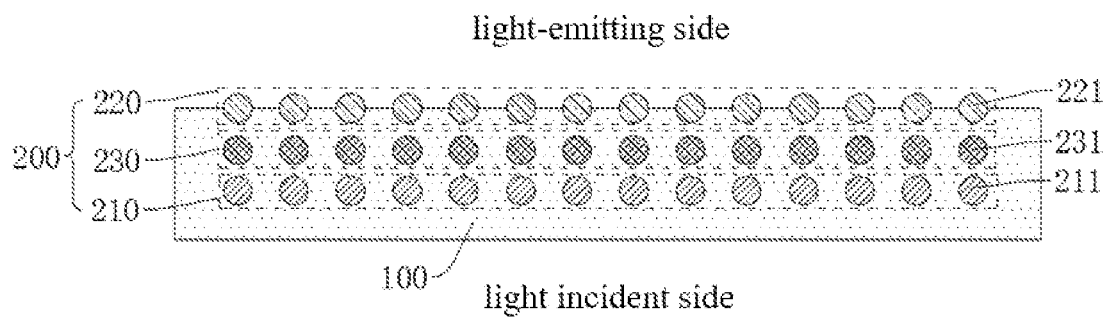
FIG. 2 is a second structural schematic diagram of an optical film layer described in the present application.

Please refer to FIG. 2. FIG. 2 is a second structural schematic diagram of an optical film layer described in the present application. In the optical film layer of the present application, the size of the first optical particle 211 may be the same as the size of the second optical particle 221. In other words, the shapes and sizes of the first optical particle 211 and the second optical particle 221 may be the same.

In this embodiment, the shape and size of the first optical particle 211 and the second optical particle 221 are the same, and under the premise that the distribution density of the first optical particles 211 in the first particle layer 210 is the same as the distribution density of the second optical particles 221 in the second particle layer 220, the refractive index of the first optical particles 211 may be greater than the refractive index of the second optical particles 221.

Similar to the above analysis, in this embodiment, through the aforesaid settings, the refractive index of the optical film layer can also be reduced in the direction from the first side of the optical film layer to the second side of the optical film layer, to achieve the effect of the graded refraction indices, to achieve the purpose of reducing the total amount of ambient light reflected by the optical film layer, and effectively improve the anti-glare effect.

Figure 3:
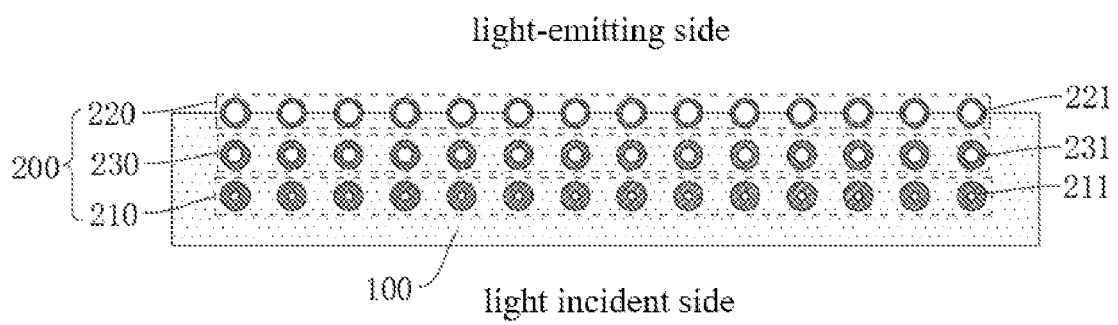
FIG. 3 is a third structural schematic diagram of an optical film layer described in the present application.

Please refer to FIG. 3, which is a third structural schematic diagram of an optical film layer described in the present application. In the optical film layer of the present application, the first optical particles 211 and the second optical particles 221 may be hollow shells structures.

In this embodiment, by setting the first optical particle 211 and the second optical particle 221 as hollow shell structures, the light is not only refracted and reflected on the surface of the hollow shell structures of the first optical particle 211 and the second optical particle 221, it is also refracted and reflected by the air medium inside the hollow shell structures so that the uniformity of the haze can be further improved, and the undesired phenomena such as flashpoints can be effectively reduced.

Please refer to FIG. 3, in the optical film layer of the present application, the first optical particles 211 and the second optical particles 221 may be spherical shells with hollow interiors. This improves the fluidity of the first optical particles 211 and the second optical particles 221 within the base layer 100 and facilitates the uniform distribution of the optical particles in the first particle layer 210 and the second particle layer 220, thereby improving the uniformity of haze.

In this embodiment, under the premise that the refractive index of the first optical particles 211 is the same as the refractive index of the second optical particles 221, the size of the first optical particle 211 is the same as the size of the second optical particle 221, and the distribution density of the first optical particles 211 is the same as the distribution density of the second optical particles 221, the shell thickness of the first optical particle 211 may be greater than the shell thickness of the second optical particle 221.

It should be noted that, in this embodiment, when the first optical particles 211 or the second optical particles 221 are spherical shells with hollow interiors, the size of the first optical particle 211 or the size of the second optical particle 221 refers to the diameter of the outer surface of the spherical shell. The outer surface of the spherical shell can be understood as the contact surface between the optical particles and the base layer 100.

Similar to the aforesaid principle, the variation law of the shell thickness in this embodiment can also make the refractive indices of the optical film layer decrease in the direction from the first side of the optical film layer to the second side of the optical film layer, thereby achieving the effect of graded refractive indices, achieving the purpose of reducing the total amount of ambient light reflected by the optical film layer, and effectively improving the anti-glare effect.

Figure 4:
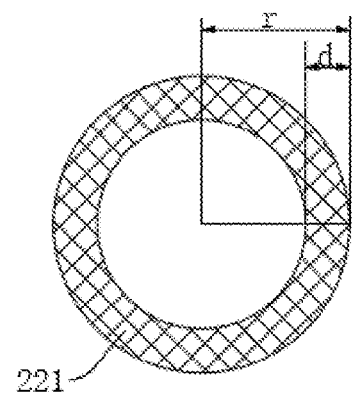
FIG. 4 is a schematic structural diagram of an optical particle described in the present application.

Please refer to FIG. 4, which is a schematic structural diagram of an optical particle described in the present application. When the optical particles are spherical shells, the ratio of the shell thickness d of the spherical shell to the radius r of the spherical shell is greater than or equal to ⅕, that is, d/r≥⅕, so that the optical particles have sufficient strength. This prevents the optical particles from being crushed under pressure in the base layer 100, thereby further stabilizing the anti-glare effect.

Figure 5:
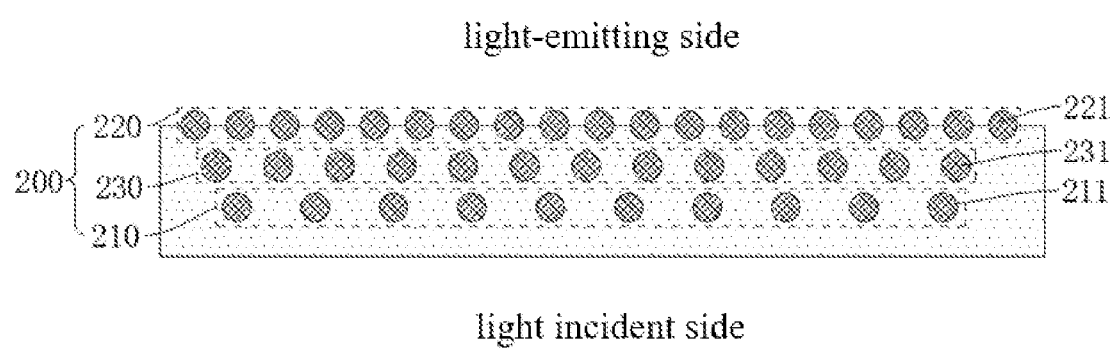
FIG. 5 is a fourth structural schematic diagram of an optical film layer described in the present application.

Please refer to FIG. 5, which is a fourth structural schematic diagram of an optical film layer described in the present application. In the optical film layer of the present application, under the premise that the refractive index of the first optical particle 211 is the same as the refractive index of the second optical particle 221, the shape of the first optical particle 211 is the same as the shape of the second optical particle 221, and the size of the first optical particle 211 is the same as the size of the second optical particle 221, the shell thickness of the first optical particle 211 may be greater than the shell thickness of the second optical particle 221. In the top view of the optical film layer, the distribution density of the first optical particles 211 may be less than the distribution density of the second optical particles 221.

In this embodiment, through the aforesaid settings, the distribution density of the optical particles in the second optical film layer close to the second side of the optical film layer is higher, so that more diffuse reflections are formed when ambient light strikes the surface of the second side of the optical film layer, thereby effectively reducing the flashpoint phenomenon.

Please refer to FIG. 1, FIG. 2, FIG. 3 and FIG. 5, in the optical film layer of the present application, the group of particle layers 200 further includes at least a third particle layer 230. The third particle layer 230 is provided between the first particle layer 210 and the second particle layer 220.

In this embodiment, the group of particle layers 200 may include three or more particle layers, wherein the fourth particle layer, the fifth particle layer, the sixth particle layer . . . (not shown in the figure) are sequentially stacked along the direction from the first side of the optical film layer to the second side of the optical film layer.

In this embodiment, the refractive index of the third particle layer 230 may be less than that of the first particle layer 210, and the refractive index of the third particle layer 230 may be greater than that of the second particle layer 220. That is, the refractive index of the third particle layer 230 is between the refractive index of the first particle layer 210 and the refractive index of the second particle layer 220.

Further, in this embodiment, the refractive indices of the fourth particle layer, the fifth particle layer, the sixth particle layer . . . gradually decrease, and are all between the refractive index of the first particle layer 210 and the refractive index of the second particle layer 220.

In this embodiment, as described above, the refractive index of the third particle layer 230 can be adjusted by changing the shape, size, refractive index, and distribution density of the third optical particle 231. According to the relationship between the refractive index of the third particle layer 230 and the refractive index of the first particle layer 210 and the refractive index of the second particle layer 220, the relationship between the shape, size, refractive index, and distribution density of the third optical particle 231 and the shape, size, refractive index, and distribution density of the first optical particle 211 and those of the second optical particle 221 can be obtained. This embodiment will not describe in detail herein.

In this embodiment, three or more particle layers are arranged in the base layer 100, so that the change of the refractive index in the optical film layer is gentle and uniform. It is beneficial to achieve higher haze and can effectively reduce the amount of reflection of ambient light, thereby improving the anti-glare effect.

Please refer to FIG. 5, in the optical film layer of the present application, the first particle layer 210 includes a plurality of first optical particles 211, the second particle layer 220 includes a plurality of second optical particles 221, and the third particle layer 230 includes a plurality of third optical particles 231. The shape, size, and refractive index of the plurality of first optical particles 211 are the same, the shape, size, and refractive index of the plurality of second optical particles 221 are the same, and the shape, size, and refractive index of the plurality of third optical particles 231 are the same.

In this embodiment, through the above settings, the material properties of the optical particles in each particle layer are made uniform, which can prevent the phenomenon of uneven refraction or reflection from occurring in each particle layer.

Figure 6:
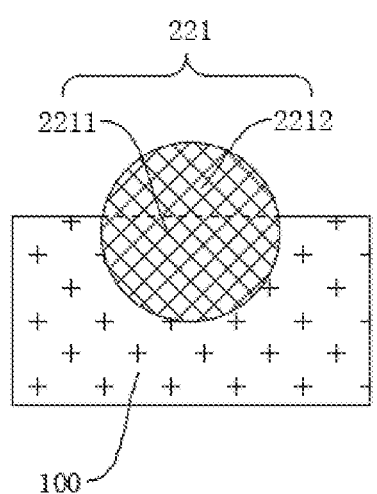
FIG. 6 is a schematic diagram of a relative position of the second optical particle and the base layer described in the present application.

Please refer to FIG. 6, which is a schematic diagram of the relative position of the second optical particle 221 and the base layer 100 described in the present application. In the optical film layer of the present application, the second optical particle 221 includes an integrally formed embedded portion 2211 and a convex portion 2212. The embedded portion 2211 is positioned in the base layer 100, and the convex portion 2212 protrudes from the surface of the base layer 100. In this embodiment, the volume of the embedded portion 2211 is greater than or equal to the volume of the convex portion 2212, so a better fit is formed between the second optical particle 221 and the base layer 100. Therefore, the second optical particles 221 are not easily detached, and the anti-glare stability is improved.

The embodiment of the present application further provides a manufacturing method of an optical film layer for manufacturing the optical film layer described in the aforesaid embodiments, and the manufacturing method includes: S100, forming a first base layer on the substrate, wherein at least one particle layer is provided in the first base layer; S200, forming a second base layer on the first base layer, wherein at least one particle layer is provided in the second base layer; and S300, peeling off the substrate to form an optical film layer.

In this embodiment, the materials of the first base layer and the second base layer are the same to form an integral base layer 100. The material of the first base layer and the second base layer may be the same resin material, such as polyimide, polyester material, or the like.

In this embodiment, the refractive indices of the particle layers gradually decrease in the direction from the first base layer to the second base layer, so that the refractive indices of the particle layers in the entire base layer 100 exhibit a gradual trend, thereby achieving the anti-glare effect.

The embodiments of the present application further provide a polarizer, and the polarizer may include the optical film layer described in the aforesaid embodiments.

Embodiments of the present application further provide a display panel, which includes a panel and the polarizer described in the aforesaid embodiments. The polarizer is provided above the light-emitting surface of the panel. The panel may be, but not limited to, a liquid crystal panel, an organic light-emitting diode (OLED) panel, a light-emitting diode (LED) panel, or the like.

In the present application, by arranging a group of particle layers 200 including multiple particle layers in the base layer 100, and by adjusting the shape, size, material, distribution density, etc. of the optical particles in each particle layer, the refractive indices of the multiple particle layers gradually decrease in the direction from the first side of the optical film layer to the second side of the optical film layer, so that the multiple particle layers form a composite film layer with graded refractive indices. The multiple particle layers can convert specular reflection into diffuse reflection to cause the optical film layer to have characteristics of high haze and low reflection. Furthermore, a large number of particles are embedded in the base layer 100, which can effectively prevent the particles from being scratched or detached. In addition, the optical film layer can be manufactured by a mature optical particle anti-glare technology, so the manufacturing cost can be effectively reduced.

The optical film layer provided by the embodiments of the present application has been described in detail above. The principles and implementations of the present application are described herein with specific embodiments. The descriptions of the embodiments are only used to help understand the method of the present application and its core idea. Meanwhile, for one skilled in the art, according to the idea of the present application, there will be changes in the specific embodiments and the scope of application. In conclusion, the content of this specification should not be construed as a limitation on the present application.

What is claimed is:

1. An optical film layer, comprising:
  a base layer; and
  a group of particle layers, wherein the group of particle layers comprises multiple particle layers, the multiple particle layers comprise at least a first particle layer and a second particle layer, the first particle layer is positioned within the base layer, the first particle layer is close to a first side of the optical film layer, the second particle layer is close to a second side of the optical film layer, a portion of the second particle layer is positioned within the base layer and another portion of the second particle layer protrudes from a surface of the base layer on the second side of the optical film layer;
  wherein overall refractive indices of each of the particle layers in the multiple particle layers gradually decrease in a direction from the first side of the optical film layer to the second side of the optical film layer, and
  wherein the first particle layer comprises first optical particles, and the second particle layer comprises second optical particles, and wherein a refractive index of the first optical particles and a refractive index of the second optical particles are the same.

2. The optical film layer of claim 1, wherein a size of one of the first optical particles is smaller than a size of one of the second optical particles.

3. The optical film layer of claim 1, wherein the first optical particles and the second optical particles are hollow shell structures.

4. The optical film layer of claim 3, wherein the first optical particles and the second optical particles are spherical shells with hollow interiors.

5. The optical film layer of claim 4, wherein a size of one of the first optical particles is the same as a size of one of the second optical particles.

6. The optical film layer of claim 5, wherein a shell thickness of the first optical particle is greater than a shell thickness of the second optical particle.

7. The optical film layer of claim 6, wherein a ratio of a shell thickness of one of the spherical shells to a radius of the spherical shell is greater than or equal to $1/5$.

8. The optical film layer of claim 7, wherein in a top view of the optical film layer, a distribution density of the first optical particles is less than a distribution density of the second optical particles.

9. The optical film layer of claim 1,
  wherein a size of one of the first optical particles and a size of one of the second optical particles are smaller than a wavelength of visible light.

10. A manufacturing method of an optical film layer for manufacturing the optical film layer of claim 1, comprising:
  forming a first base layer provided with at least one particle layer on a substrate;
  forming a second base layer provided with at least one particle layer on the first base layer; and
  peeling off the substrate to form an optical film layer;
  wherein a material of the first base layer and a material of the second base layer are the same to form an integral base layer; and
  wherein an overall refractive index of the at least one particle layer gradually decreases in a direction from the first base layer to the second base layer.

11. A polarizer, comprising the optical film layer of claim 1.

12. A display panel, comprising a panel and the polarizer as claimed in claim 11, wherein the polarizer is provided above a light-emitting surface of the panel.

13. An optical film layer, comprising:
  a base layer; and
  a group of particle layers, wherein the group of particle layers comprises multiple particle layers, the multiple particle layers comprise at least a first particle layer and a second particle layer, the first particle layer is positioned within the base layer, the first particle layer is close to a first side of the optical film layer, the second particle layer is close to a second side of the optical film layer, a portion of the second particle layer is positioned within the base layer and another portion of the second particle layer protrudes from a surface of the base layer on the second side of the optical film layer;

wherein overall refractive indices of each of the particle layers in the multiple particle layers gradually decrease in a direction from the first side of the optical film layer to the second side of the optical film layer, and wherein the first particle layer comprises first optical particles and the second particle layer comprises second optical particles, and wherein a size of one of the first optical particles is the same as a size of one of the second optical particles.

14. The optical film layer of claim 13, wherein a refractive index of the first optical particle is greater than a refractive index of the second optical particle.

15. An optical film layer, comprising:
a base layer; and
a group of particle layers, wherein the group of particle layers comprises multiple particle layers, the multiple particle layers comprise at least a first particle layer and a second particle layer, the first particle layer is positioned within the base layer, the first particle layer is close to a first side of the optical film layer, the second particle layer is close to a second side of the optical film layer, a portion of the second particle layer is positioned within the base layer and another portion of the second particle layer protrudes from a surface of the base layer on the second side of the optical film layer;

wherein overall refractive indices of each of the particle layers in the multiple particle layers gradually decrease in a direction from the first side of the optical film layer to the second side of the optical film layer, and wherein the first particle layer comprises first optical particles, and the second particle layer comprises second optical particles, wherein a refractive index of the first optical particles is the same as a refractive index of the second optical particles, and wherein a size of one of the first optical particles is the same as a size of one of the second optical particles.

* * * * *